Oct. 31, 1933.  B. NAGY  1,932,529

BOTTLE CROWN CAP FEEDER

Original Filed July 27, 1932  2 Sheets-Sheet 1

INVENTOR
Berthold Nagy
BY
James Harrison Bowen
ATTORNEY

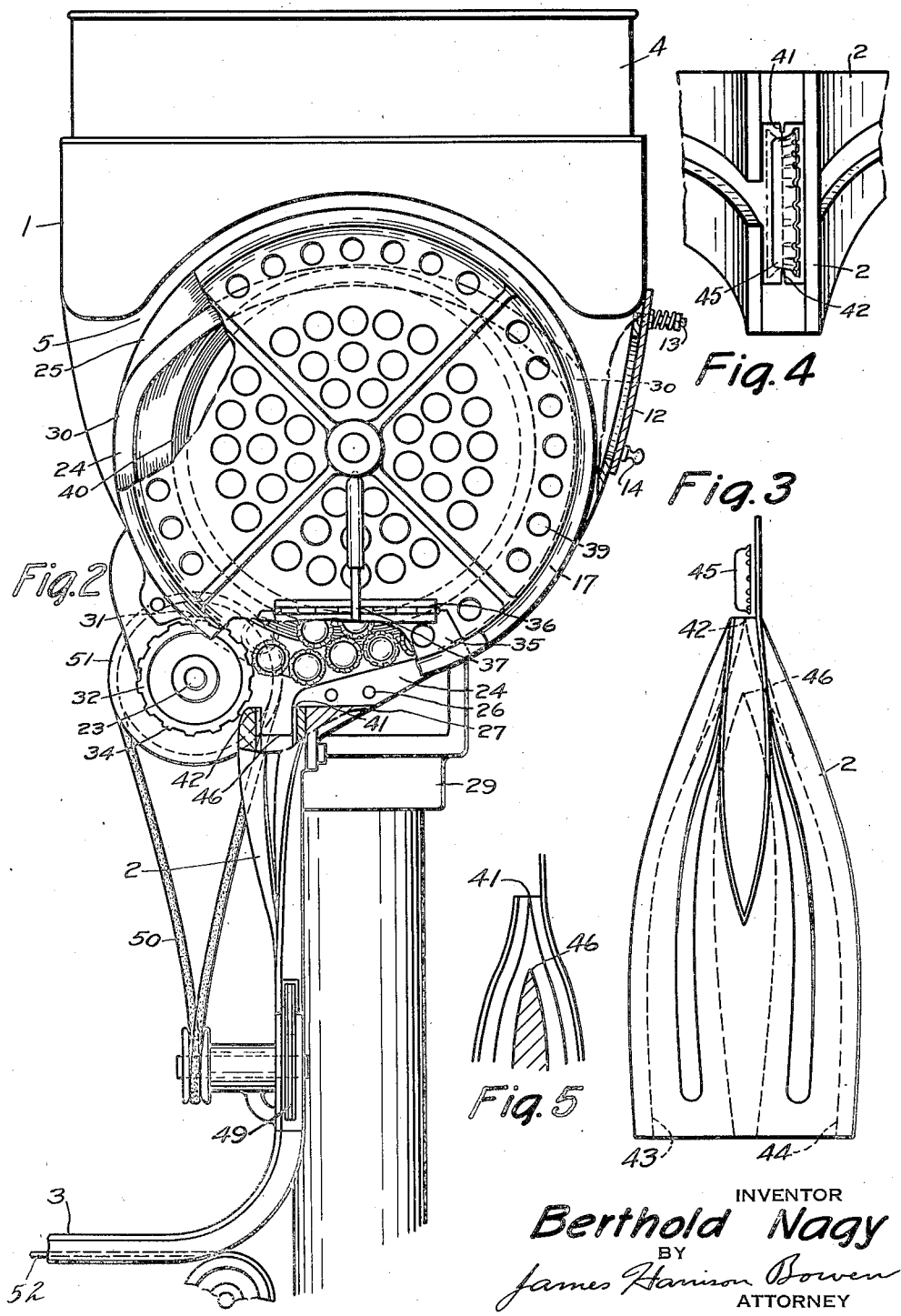

Patented Oct. 31, 1933

1,932,529

UNITED STATES PATENT OFFICE 1,932,529

BOTTLE CROWN CAP FEEDER

Berthold Nagy, Ridgewood, N. Y.

Application July 27, 1932. Serial No. 625,150
Renewed September 5, 1933

23 Claims. (Cl. 113—114)

The invention is a feeder for bottle crown caps or the like which is so constructed that the caps may be placed into a hopper and fed thru chutes to a machine or the like.

The object of the invention is to provide a feeding device for bottle crown cap assembling machines or the like which handles the caps without injuring them or even marring designs thereon.

Another object of the invention is to provide a hopper for bottle crown cap feeding machines which is provided with spring doors at the sides and back thru which foreign particles or imperfect crowns or the like may be quickly removed without unclamping or unscrewing any of the parts.

Another object is to provide a hopper having sight holes thru which the crowns may be observed at all times.

Another object is to provide a feeding device which is so arranged that it will feed a comparatively large number of crowns or the like with a comparatively slow movement of the operating parts.

Another object is to provide means for feeding bottle crown caps with a much greater speed than any similar machine.

Another object of the invention is to provide means for feeding bottle crown caps with all the caps turned on the same side.

Another object is to provide a combination chute for bottle crown cap feeding machines which will receive caps turned on either side and deliver the crowns with all of them turned on the same side.

Another object is to provide means in a bottle crown cap feeding machine for preventing two crowns stopping at the entrance to the chute.

A still further object is to provide a hopper for bottle crown cap feeding devices which may readily be filled with crowns without danger of the crowns being caught therein.

And a still further object of the invention is to provide a feeder for bottle crown caps which is of a comparatively simple and economical construction.

With these ends in view the invention embodies a hopper with a shaft passing therethru, drums and wheels on said shaft, said drums forming part of the hopper, vertical chutes extending downward from said drums, feeding means at the upper ends of said chutes, means in said chutes for turning all crowns placed therein on the same side, and a common chute for receiving the crowns from said former chutes and feeding them to an assembling machine.

Other features and advantages of the invention will appear from the following description taken in connection with the drawings, wherein:

Figure 2 is a view showing an end elevation of the feeder also with part broken away.

Figure 3 is a view showing the front elevation of the separating chute.

Figure 4 is a plan view showing the upper end of the chute.

Figure 5 is a detail showing a cross section thru the upper end of the chute.

Figure 1:
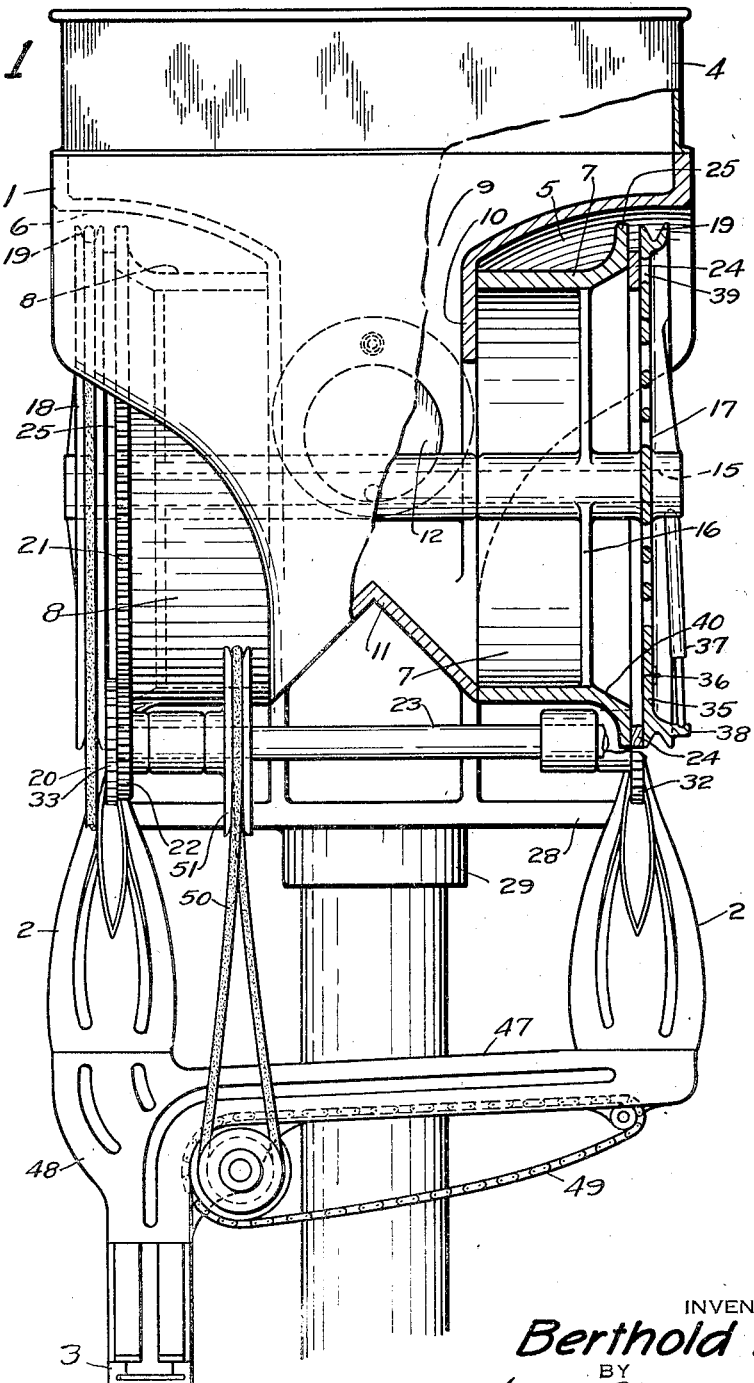
Figure 1 is a view showing a front elevation of the feeder, with part broken away.

In the drawings the device is shown as it would be made wherein numeral 1 indicates the hopper, numeral 2 the separating chute, and numeral 3 a common chute thru which the crowns may be fed to an assembling machine, or the like, or to any object.

In the design shown the hopper 1 is made of a rectangular shape with a base, to which the numeral 1 refers, formed of a casting and an upper portion, as indicated by the numeral 4, which may be considered as an extension to the base. Altho this is shown and described as being of a rectangular shape it will be understood that it may be made of any shape and arranged in any other manner. The base 1 is formed with recesses 5 and 6 at the sides in which rotary drums 7 and 8 are mounted and between the drums is a central portion 9 with webs 10 at the ends of the drums. The base of the central portion 9 is formed in the shape of an inverted V, as indicated by the numeral 11, and it will be noted that crowns placed in the hopper will be fed toward the drums 7 and 8 at the sides. At the rear of the base is a door 12, as shown in Figures 1 and 2, which may be pivotally mounted on a spring pin 13 and gripped by a knob 14 so that it may readily be opened in order to inspect the interior of the hopper. It will be understood that this door may be of any shape or design and may be positioned at any convenient point in the hopper.

In the center of the hopper is a shaft 15 upon which the drums 7 and 8 are mounted thru spokes 16 and at the outer ends of the drums are wheels 17 and 18 having grooves 19 in their outer surfaces by which they may be rotated from any suitable source thru a belt 20, as shown on the wheel 18. It will be understood that it is only necessary to drive one of the wheels and it will also be understood that either wheel may be driven. A gear 21 may be formed in a flange at the end of one of the drums and preferably adjacent the pulley thru which the device is driven and this gear meshes with a pinion 22 on a shaft 23 at one side of the drums so that the shaft may be rotated as the drums rotate. Stationary rails 24 are mounted between the pulleys 17 and 18 and the flanges 25 in which the gear 21 is formed and these rails may be held by screws 26 upon projections 27 which are formed on extensions 28 of a hub 29 that is formed at the lower side of the base of the hopper 1. The rails 24 are shaped, as shown in Figure 2, with the upper part flattened from the points 30, and with one of the lower ends pointed, and with the other end terminating at a point 31 thereby providing an opening thru which the crowns may pass. It will be noted that, as hereinbefore stated, the bars 24 are stationary and the surfaces at both sides thereof moving as the surface of one side is formed by the inner surface of the pulleys 17 and 18 and at the other by the flanges 25 at the ends of the drums. The crowns may therefore rest upon a stationary member and will be moved toward the opening therein by the travelling surfaces at the sides, and should they travel upward they will be forced out of the space between the wheels and drum flanges by the flattened portions of the rails 24. In order to prevent two of the crowns sticking at the opening, as illustrated in the positions thereof shown in Figure 2, discs 32 and 33 are provided on the shaft 23 and the outer surfaces of these discs are provided with teeth 34 so that the crown resting upon the surface of the disc will be moved upward to the position shown in dotted lines in Figure 2 and the other crown will be permitted to drop downward. This device will insure positive feeding of the crowns from the drums of the hopper at all times. The pulleys 17 and 18 may also be provided with doors 35 in their outer edges and it will be noted that the doors may readily be opened to inspect the crowns and remove foreign particles or damaged or imperfect crowns. The doors 35 may be mounted by hinges 36 and held in position by spring rods 37 one end of which fits into a notch in the hubs of the pulleys, and the other in notches in lugs 38 on the outer edges of the doors. The pulleys may also be provided with openings 39 which are somewhat smaller than the crowns so that the interior of the drums may readily be inspected thru the pulleys without stopping the machine. It will be understood that these openings may be arranged in any other manner and may also be of any other shape or description. It will be noted that the inner surfaces of the drums 7 and 8 are bevelled at their outer edges, as indicated by the numeral 40, so that the crowns will readily pass downward upon the rails 24. It will be also be understood that the drums may be of any other shape or design and arranged in any manner.

As the crowns drop downward from the drums of the hopper 1 and thru the openings in the bars 24 they pass into the chutes 2 and from these chutes they pass into the common chute 3. It will be noted that the crowns may drop downward with their faces turned inward or outward and the sides of the chutes 2 are therefore provided with central webs 41 and 42 which engage the flanges of the crowns and convey the crowns toward either side of the chute depending upon the direction in which the crowns face. It will be noted, as shown in Figures 3, 4 and 5, that the chutes 2 are divided into two parts forming two separate and distinct passages 43 and 44 and if the crowns drop into the upper end of the chute facing one direction they will pass into the passage 44, and if they are facing the opposite direction they will pass into the passage 43 and the passages 43 and 44 are so shaped that both of them will deliver the crowns facing in the same direction. A crown, as indicated by the numeral 45, is shown in Figures 3 and 4, facing toward the chute 44 and it will be noted that as the crown drops downward the flange thereof will engage the points 41 and 42 so that it will pass over a divisional point 46 of the chute and downward into the passage 44, whereas if the crown were facing in the opposite direction the flanges thereof would engage the opposite sides of the points 41 and 42 so that the crown would be guided to the opposite side of the point 46 and would pass downward into the passage 43, but it will be noted that the passages 43 and 44 twist so as to turn the crowns thru an angle of 90 degrees as they pass from the top to the bottom of the chutes.

At the lower ends of the chutes is a connecting chute 47 and at one end of this chute is a section 48 having double passages therein connecting with the passages 43 and 44 of the chute 2 positioned above it and these passages feed into a common passage which extends from the lower end of the chute 2 at the opposite side of the machine. A chain 49 may be provided in the lower side of the connecting chute 47 and this may be driven by a belt 50 on a pulley 51 on the shaft 23 so that crowns may readily be conveyed from one side of the machine to the other. The connecting chute 47 feeds the crowns to the common chute 3 which may be of any type, size, or description, and may be arranged to feed the crowns to any point or points or to any type of assembling machine. The chute 3, as shown, is provided with a 90 degree bend and a belt conveyer 52 may be provided in the lower side if desired. It will be understood that this chute may be used to feed the crowns to one or any number of machines or to a hopper or any other device.

It will be understood that other changes may be made in the construction without departing from the spirit of the invention. One of which changes may be in the use of the machine for crowns or caps of any other shape or design, another may be in the use of a hopper of any other description, another may be in the use of other means for feeding the crowns to the chutes 2, and still another may be in the use of other means for feeding the crowns from the chutes 2 to the assembling machine.

The construction will be readily understood from the foregoing description. In use the device may be provided as shown and described and it will be noted that the hopper may be filled with bottle caps or crowns and as the drums are rotated the crowns will be fed into the chutes 2 and the chutes 2 will turn the crowns so that all of them will be placed upon the belt conveyer 52 face down. It will be noted that with a feeding device arranged in this manner it will be possible to feed a large number of crowns or bottle caps with the drums rotating at a comparatively slow speed and as the caps are very carefully handled there will be no danger whatever of damaging them or even marring the designs by which the caps are decorated.

It will be understood that altho this machine is described as being particularly adapted to bottle caps or crowns, it may also be used for any other somewhat similar objects having a flange at one side, and may also be adapted for buttons or parts thereof, or any other similar products.

Having thus fully described the invention what I claim as new and desire to secure by Letters Patent is:

1. In a hopper for crowns or the like, a central chamber the lower sides of which slope toward outlet points, rotary drums at the sides of said hopper, wheels at the ends of said rotary drums, and stationary rails between said wheels and drums, said rails having outlet openings therein.

2. In a hopper for crowns or the like, a central chamber the lower sides of which slope towards outlet points, rotary drums at the sides of said hopper, wheels at the ends of said rotary drums, stationary rails between said wheels and drums, said rails having outlet openings therein, and an agitator in said outlet opening adapted to prevent crowns sticking therein.

3. In a hopper for crowns or the like, a central chamber the lower sides of which slope toward outlet points, rotary drums at the sides of said hopper, wheels at the ends of said rotary drums, stationary rails between said wheels and drums, said rails having outlet openings therein, an agitator in said outlet opening adapted to prevent crowns sticking therein, and doors in said wheels and hopper.

4. In a hopper for crowns or the like, a central chamber the lower sides of which slope toward outlet points, rotary drums at the sides of said hopper, wheels at the ends of said rotary drums, stationary rails between said wheels and drums, said rails having outlet openings therein, and means in said outlet opening adapted to prevent crowns sticking therein.

5. In a hopper for bottle crown caps or the like, a central chamber the lower sides of which slope toward outlet points, rotary drums at the sides of said hopper, wheels at the ends of said rotary drums, stationary rims between said wheels and drums, said rims having outlet openings therein, an agitator in said outlet opening adapted to prevent caps sticking therein, and the outer ends of said drums bevelled toward said stationary rim.

6. In a hopper of the character described, a central chamber having sloping bottom surfaces, rotating drums at the sides of said chamber, wheels at the outer ends of said rotating drums, stationary bars between said wheels and drums, said bars having outlet openings therein, toothed discs adapted to rotate in said outlet openings, means for rotating said drums, and means for rotating said toothed discs from said drums.

7. In a hopper of the character described, a central chamber having sloping bottom surfaces, rotating drums at the sides of said chamber, the inner surfaces of said rotating drums bevelled outward at the outer ends, wheels at the outer ends of said rotating drums, stationary bars between said bars and drums, said bars having outlet openings therein, toothed discs adapted to rotate in said outlet openings, means for rotating said drums, means for rotating said toothed discs from said drums, and chutes extending downward from the openings in said bars.

8. A feed hopper for bottle crowns, comprising a central chamber the lower sides of which slope toward outlet points, rotary drums at the sides of said hopper, wheels at the ends of said rotary drums, stationary rails between said wheels and drums, said rails having outlet openings therein, chutes leading downward from said drums, means in said chutes for turning all of said crowns in the same direction, and a cross chute connecting all of said chutes to a common chute.

9. In a hopper of the character described, a central chamber having sloping bottom surfaces, rotating drums at the sides of said chamber, the inner surfaces of said rotating drums bevelled outward at the outer ends, wheels at the outer ends of said rotating drums, stationary bars between said wheels and drums, said bars having outlet openings therein, toothed discs adapted to rotate in said outlet openings, means for rotating said drums, means for rotating said toothed discs from said drums, chutes extending downward from the openings in said bars, and means in said chutes for turning all of the crowns in the same direction.

10. In a hopper of the character described, a central chamber having sloping bottom surfaces, rotating drums at the sides of said chamber, the inner surfaces of said rotating drums bevelled outward at the outer ends, wheels at the outer ends of said rotating drums, stationary bars between said wheels and drums, said bars having outlet openings therein, toothed discs adapted to rotate in said outlet openings, means for rotating said drums, means for rotating said toothed discs from said drums, chutes extending downward from the openings in said bars, means in said chutes for turning all of the crowns in the same direction, and means connecting said chutes to a common chute.

11. A feed hopper for bottle crowns, or the like, comprising a central chamber, the lower sides of which slope toward outlet points, rotary drums at the sides of said hopper, wheels at the ends of said rotary drums, stationary rails between said wheels and drums, said rails having outlet openings therein, an agitator in said outlet opening adapted to prevent crowns sticking therein, a double chute extending downward from said outlet opening, tracks in the sides of said double chute adapted to face all of the crowns in the same direction, and a cross chute connecting the said chutes.

12. A feed hopper for bottle crowns, comprising a central chamber, the lower sides of which slope toward outlet points, rotary drums at the sides of said hopper, wheels at the ends of said rotary drums, stationary rails between said wheels and drums, said rails having outlet openings therein, chutes leading downward from said drums, and means in said chutes for turning all of the crowns in the same direction.

13. In a hopper for crowns or the like, a central chamber the lower sides of which slope toward outlet points, rotary drums at the sides of said hopper, wheels at the ends of said rotary drums, said wheels having sight openings therethru providing means for inspecting the interior of the hopper, and stationary rails between said wheels and drums, said rails having outlet openings therein.

14. In a hopper for crowns or the like, a central chamber the lower sides of which slope toward outlet points, rotary drums at the sides of said hopper, wheels at the ends of said rotary drums, said wheels having a plurality of openings of a smaller diameter than that of the crowns therethru, said openings extending continuously over the wheels with the exception of the space for the spokes thereof, and stationary rails between said wheels and drums, said rails having outlet openings therein.

15. In a hopper for crowns or the like, a central chamber the lower sides of which slope toward outlet points, rotary drums at the sides of said hopper, the inner surface of the outer portion of said rotary drums bevelled outward, spokes in said drums at the edge of said bevelled surface forming agitators for the crowns, wheels at the ends of said rotary drums, and stationary rails between said wheels and drums, said rails having outlet openings therein.

16. In a hopper for crowns or the like, a central chamber the lower sides of which slope toward outlet points, rotary drums at the sides of said hopper, the inner surface of the outer portion of said rotary drums bevelled outward, spokes in said drums at the edge of said bevelled surface forming agitators for the crowns, wheels at the ends of said rotary drums, the distance between said spokes and the inner surfaces of said wheels being less than the diameter of said crowns, and stationary rails between said wheels and drums, said rails having outlet openings therein.

17. In a hopper for crowns or the like, a central chamber the lower sides of which slope toward outlet points, rotary drums at the sides of said hopper, wheels at the ends of said rotary drums, agitating means in said drums, said agitating means spaced from the inner surfaces of said wheels a smaller distance than that of the diameter of the crowns, and stationary rails between said wheels and drums, said rails having outlet openings therein.

18. In a hopper of the character described, a central chamber having sloping bottom surfaces, rotating drums at the sides of said chamber, wheels at the outer ends of said rotating drums, stationary bars between said wheels and drums, said bars having outlet openings therein, toothed discs adapted to rotate in said outlet openings, means for rotating said drums, a gear on one of said drums, and a gear on said toothed discs meshing with the gear on said drum and driven thereby.

19. In a hopper of the character described, a central chamber having sloping bottom surfaces, rotating drums at the sides of said chamber, wheels at the outer ends of said rotating drums, stationary bars between said wheels and drums, said bars having outlet openings therein, toothed discs adapted to rotate in said outlet openings, means for rotating said drums, from either side of said hopper, and means for rotating said toothed discs from said drums.

20. In a hopper of the character described, a central chamber having sloping bottom surfaces, rotating drums at the sides of said chamber, the inner surfaces of said rotating drums bevelled outward at the outer ends, wheels at the outer ends of said rotating drums, stationary bars between said wheels and drums, said bars having outlet openings therein, toothed discs adapted to rotate in said outlet openings, means for rotating said drums, means for rotating said toothed discs from said drums, chutes extending downward from the openings in said bars, a cross chute connecting the chutes from both sides of said hopper, and a travelling continuous chain forming the bottom of said cross chute and adapted to convey all crowns to one side.

21. In a hopper of the character described, a central chamber having sloping bottom surfaces, rotating drums at the sides of said chamber, the inner surfaces of said rotating drums bevelled outward at the outer ends, wheels at the outer ends of said rotating drums, stationary bars between said wheels and drums, said bars having outlet openings therein, toothed discs adapted to rotate in said outlet openings, means for rotating said drums, means for rotating said toothed discs from said drums, chutes extending downward from the openings in said bars, a cross chute connecting the chutes from both sides of said hopper, and a travelling continuous chain forming the bottom of said cross chute and adapted to convey all crowns to one side and agitate the crowns at the intersection of the two chutes.

22. In a hopper of the character described, a central chamber having sloping bottom surfaces, rotating drums at the sides of said chamber, the inner surfaces of said rotating drums bevelled outward at the outer ends, wheels at the outer ends of said rotating drums, stationary bars between said wheels and drums, said bars having outlet openings therein, toothed discs adapted to rotate in said outlet openings, means for rotating said drums, means for rotating said toothed discs from said drums, chutes extending downward from the openings in said bars, a cross chute connecting the chutes from both sides of said hopper, a travelling continuous chain forming the bottom of said cross chute and adapted to convey all crowns to one side and agitate the crowns at the intersection of the two chutes, and means driving said chain from said drums.

23. In a hopper of the character described, a central chamber having sloping bottom surfaces, rotating drums at the sides of said chamber, the inner surfaces of said rotating drums bevelled outward at the outer ends, wheels at the outer ends of said rotating drums, stationary bars between said wheels and drums, said bars having outlet openings therein, toothed discs adapted to rotate in said outlet openings, means for rotating said drums, means for rotating said toothed discs from said drums, chutes extending downward from the openings in said bars, means connecting said chutes, conveying means in said connecting means for conveying the crowns to one point at the intersection of said chutes and agitating the crowns at said intersection.

BERTHOLD NAGY.